(12) United States Patent
Shilo et al.

(10) Patent No.: US 12,015,489 B2
(45) Date of Patent: Jun. 18, 2024

(54) COMMUNICATION TRANSMITTER FOR RETRANSMITTING MEDIUM ACCESS CONTROL (MAC) PROTOCOL DATA UNIT (MPDU)

(71) Applicant: Huawei Technologies Co., Ltd., Shenzhen (CN)

(72) Inventors: Shimon Shilo, Hod Hasharon (IL); Nadav Basson, Hod Hasharon (IL); Ezer Melzer, Hod Hasharon (IL); Yaron Ben-Arie, Hod Hasharon (IL); Mor Reich, Hod Hasharon (IL); Doron Ezri, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 367 days.

(21) Appl. No.: 17/521,456

(22) Filed: Nov. 8, 2021

(65) Prior Publication Data

US 2022/0069949 A1 Mar. 3, 2022

Related U.S. Application Data

(63) Continuation of application No. PCT/EP2019/061701, filed on May 7, 2019.

(51) Int. Cl.
*H04L 1/1812* (2023.01)
*H04L 1/08* (2006.01)

(52) U.S. Cl.
CPC ............. *H04L 1/1819* (2013.01); *H04L 1/08* (2013.01)

(58) Field of Classification Search
CPC ....... H04L 1/1819; H04L 1/08; H04L 1/0068; H04L 1/0071; H04L 1/0075
See application file for complete search history.

(56) References Cited

U.S. PATENT DOCUMENTS

2015/0016360 A1 1/2015 Merlin et al.
2016/0261724 A1 9/2016 Lee et al.
(Continued)

FOREIGN PATENT DOCUMENTS

CN 106301710 A 1/2017
WO 2009015170 A1 1/2009

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Std 802.11TM-2016, total 3534 pages (Approved Dec. 7, 2016).

*Primary Examiner* — Michael A Keller
(74) *Attorney, Agent, or Firm* — Leydig, Voit & Mayer, Ltd.

(57) ABSTRACT

A communication transmitter retransmits a Medium Access Control (MAC) Protocol Data unit (MPDU) to a communication receiver over a communication channel using a Hybrid Automatic Repeat reQuest (HARQ) retransmission scheme. The MPDU includes a plurality of information bits. The communication transmitter includes a processor configured to determine the MPDU to be retransmitted based on a Block ACK frame received from the communication receiver, the Block ACK frame indicating previously correctly decoded MPDUs at the communication receiver, and to generate a bit sequence to be transmitted to the communication receiver, wherein the bit sequence comprises the plurality of information bits. The communication transmitter further comprises a communication interface configured to transmit the bit sequence to the communication receiver for retransmitting the MPDU to the communication receiver.

15 Claims, 13 Drawing Sheets

(56) References Cited

U.S. PATENT DOCUMENTS

2016/0365952 A1* 12/2016 Kim ..................... H04L 1/1816
2020/0107325 A1* 4/2020 Zhang ................ H03M 13/1111
2020/0344006 A1* 10/2020 Shellhammer ........ H04L 1/0011
2021/0344447 A1* 11/2021 Kanamarlapudi .... H04L 5/0055

* cited by examiner

COMMUNICATION TRANSMITTER FOR RETRANSMITTING MEDIUM ACCESS CONTROL (MAC) PROTOCOL DATA UNIT (MPDU)

CROSS-REFERENCE TO RELATED APPLICATIONS

This application is a continuation of International Application No. PCT/EP2019/061701, filed on May 7, 2019, the disclosure of which is hereby incorporated by reference in its entirety.

FIELD

The present disclosure relates to the field of communication systems. In particular, the present disclosure relates to a communication transmitter for retransmitting a Medium Access Control (MAC) Protocol Data Unit (MPDU) and a corresponding communication receiver for receiving such retransmitted MPDU.

BACKGROUND

Hybrid Automatic Repeat reQuest (HARQ) is a retransmission scheme widely used in various wireless communication systems using communication standards such as Universal Mobile Telecommunications System (UMTS) or Long Term Evolution (LTE) where HARQ is mandatory. Unlike Automatic Repeat reQuest (ARQ) where incorrectly decoded communication packets are usually discarded at a communication receiver, which later on attempts to decode each retransmitted version independently of previous ones, with HARQ, soft combining of Log-Likelihood Ratios (LLRs) or combining of equalized tones from different retransmitted versions may be carried out.

This means that the LLRs respective to incorrectly decoded communication packets/codewords are stored in a memory and combined with LLRs of retransmissions of the same information; thereby increasing the probability for correct detection after retransmission. The improved performance after combining leads to a higher throughput—due to a reduced number of retransmissions and/or higher spectral efficiency due to a higher Modulation and Coding Scheme (MCS) being used.

Regarding communication systems based on the IEEE 802.11 communication standard, the use of HARQ is, however, challenging. This is particularly due to the specifications of the IEEE 802.11 communication standard—and hence any implementation of the communication standard— assuming that: (a) the Physical (PHY) layer receives a Physical Layer Convergence Protocol (PLCP) service data unit (PSDU) from the Medium Access Control (MAC) layer and is not aware of MPDU boundaries, their length, delimiters, etc.; (b) the scrambler operates on the entire PSDU, regardless of MPDU boundaries with typical periodicity of 128 bits; (c) the Forward Error Correction (FEC), e.g., using Low Density Parity Check (LDPC) codes, operates on blocks of information bits, regardless of MPDU boundaries; and (d) a block ACK (BA), that is a block acknowledgement, indicates which MPDUs within the Aggregate MPDU (A-MPDU) were decoded correctly, so retransmission occurs only for incorrectly decoded MPDUs.

Thus, there is a need for an improved communication transmitter for retransmitting an MPDU and an improved communication receiver for receiving such retransmitted MPDU.

SUMMARY

Embodiments of the disclosure provide such an improved communication transmitter for retransmitting an MPDU and such an improved communication receiver for receiving such retransmitted MPDU.

According to a first aspect, the disclosure relates to a communication transmitter for retransmitting an MPDU to a communication receiver over a communication channel using an HARQ retransmission scheme. The MPDU comprises a plurality of information bits. The communication transmitter comprises a processor configured to determine the MPDU to be retransmitted based on a Block ACK frame received from the communication receiver, the Block ACK frame indicating previously correctly decoded MPDUs at the communication receiver, and to generate a bit sequence to be transmitted to the communication receiver, wherein the bit sequence comprises the plurality of information bits. The communication transmitter further comprises a communication interface configured to transmit the bit sequence to the communication receiver for retransmitting the MPDU to the communication receiver.

Thus, an improved communication transmitter is provided which is capable to communicate within the framework of the IEEE 802.11 communication standard and which allows for an efficient use of HARQ soft-combining at the same time. The efficient use of HARQ soft-combining may particularly be realized since, regardless of any codeword boundary within the bit sequence, the information bits remain the same. Thus, the respective LLRs of the information bits can efficiently be combined at the communication receiver.

In a first possible implementation of the communication transmitter according to the first aspect as such, the processor is configured to select a first group of information bits and a second group of information bits from the plurality of information bits of the MPDU, to encode the first group of information bits using an FEC encoder to obtain a first group of parity bits, to encode the second group of information bits using the FEC encoder to obtain a second group of parity bits, and to include the first group of parity bits and the second group of parity bits into the bit sequence.

In a second possible implementation of the communication transmitter according to the first implementation of the first aspect, the processor is configured to append the first group of parity bits to the first group of information bits, and to append the second group of parity bits to the second group of information bits.

In a third possible implementation of the communication transmitter according to the second implementation of the first aspect, the processor is configured to append the second group of information bits and the second group of parity bits to the first group of information bits and the first group of parity bits.

In a fourth possible implementation of the communication transmitter according to the first implementation of the first aspect, the processor is configured to select a first plurality of subgroups of information bits from the first group of information bits and a first plurality of subgroups of parity bits from the first group of parity bits, and to select a second plurality of subgroups of information bits from the second group of information bits and a second plurality of subgroups of parity bits from the second group of parity bits.

In a fifth possible implementation of the communication transmitter according to the fourth implementation of the first aspect, the processor is configured to interleave the first plurality of subgroups of information bits and the first plurality of subgroups of parity bits within the bit sequence, and to interleave the second plurality of subgroups of information bits and the second plurality of subgroups of parity bits within the bit sequence.

In a sixth possible implementation of the communication transmitter according to the fourth implementation of the first aspect, the processor is configured to interleave the first plurality of subgroups of information bits, the first plurality of subgroups of parity bits, the second plurality of subgroups of information bits, and the second plurality of subgroups of parity bits within the bit sequence. Additionally or alternatively, the interleaving may also be applied in cases where no coding, i.e., no parity bits, are used.

In a seventh possible implementation of the communication transmitter according to the fifth implementation or the sixth implementation of the first aspect, the processor is configured to perform interleaving based upon an interleaving scheme, wherein the communication interface is configured to communicate the interleaving scheme to the communication receiver.

In an eighth possible implementation of the communication transmitter according to the first aspect as such or any implementation thereof, the processor is configured to scramble the plurality of information bits of the MPDU, or the processor is configured to scramble the bit sequence.

In a ninth possible implementation of the communication transmitter according to the eighth implementation of the first aspect, the processor is configured to perform scrambling based upon a scrambling seed, wherein the communication interface is configured to communicate the scrambling seed to the communication receiver.

In a tenth possible implementation of the communication transmitter according to the first aspect as such or any implementation thereof, the processor is configured to puncture the information bits and/or the parity bits to be included within the bit sequence. In this regard, the processor may be configured to include a subset of any group of information bits and a subset of any group of parity bits within the bit sequence.

In an eleventh possible implementation of the communication transmitter according to the tenth implementation of the first aspect, the processor is configured to perform puncturing based upon a puncturing scheme, wherein the communication interface is configured to communicate the puncturing scheme to the communication receiver.

Additionally or alternatively, the puncturing scheme may be pre-known to both the communication transmitter and the communication receiver. For example, upon a first retransmission, they both may use a puncturing scheme #1, upon a second retransmission, they both may use a puncturing scheme #2, etc.

According to a second aspect, the disclosure relates to a communication receiver for receiving a retransmitted MPDU from a communication transmitter over a communication channel using an HARQ retransmission scheme. The retransmitted MPDU comprises a plurality of information bits. The retransmitted MPDU is associated with a previously received MPDU. The communication receiver comprises a communication interface configured to transmit a Block ACK frame to the communication transmitter, the Block ACK frame indicating previously correctly decoded MPDUs at the communication receiver, and to receive a bit sequence from the communication transmitter, wherein the bit sequence comprises the plurality of information bits. The communication receiver further comprises a processor configured to determine a plurality of LLRs associated with the plurality of information bits, and to combine the determined plurality of LLRs with a previously determined plurality of LLRs associated with the previously received MPDU.

Thus, an improved communication receiver is provided which is capable to communicate within the framework of the IEEE 802.11 communication standard and which allows for an efficient use of HARQ soft-combining at the same time.

In a first possible implementation of the communication receiver according to the second aspect as such, the bit sequence further comprises a plurality of parity bits, wherein the processor is configured to determine a further plurality of LLRs associated with the plurality of parity bits, and to use a subgroup of the determined further plurality of LLRs.

In a second possible implementation of the communication receiver according to the second aspect as such or the first implementation of the second aspect, the communication interface is configured to receive an interleaving scheme and/or a scrambling seed from the communication transmitter, and to determine an alignment of the plurality of information bits and/or an alignment of the plurality of parity bits within the bit sequence based upon the interleaving scheme and/or the scrambling seed.

In a third possible implementation of the communication receiver according to the second aspect as such or any implementation thereof, the communication interface is configured to receive a puncturing scheme from the communication transmitter or to use a pre-known puncturing scheme, and to determine an alignment of the plurality of information bits and/or an alignment of the plurality of parity bits within the bit sequence based upon the puncturing scheme.

According to a third aspect, the disclosure relates to a method of operating a communication transmitter for retransmitting an MPDU to a communication receiver over a communication channel using an HARQ retransmission scheme. The MPDU comprises a plurality of information bits. The communication transmitter comprises a processor and a communication interface. The method comprises determining, by the processor, the MPDU to be retransmitted based on a Block ACK frame received from the communication receiver, the Block ACK frame indicating previously correctly decoded MPDUs at the communication receiver, generating, by the processor, a bit sequence to be transmitted to the communication receiver, wherein the bit sequence comprises the plurality of information bits, and transmitting, by the communication interface, the bit sequence to the communication receiver for retransmitting the MPDU to the communication receiver.

The method according to the third aspect can be performed by the communication transmitter according to the first aspect of the disclosure. Further features of the method according to the third aspect result directly from the functionality of the communication transmitter according to the first aspect.

According to a fourth aspect, the disclosure relates to a method of operating a communication receiver for receiving a retransmitted MPDU from a communication transmitter over a communication channel using an HARQ retransmission scheme. The retransmitted MPDU comprises a plurality of information bits. The retransmitted MPDU is associated with a previously received MPDU. The communication receiver comprises a communication interface and a processor. The method comprises transmitting, by the communication interface, a Block ACK frame to the communication transmitter, the Block ACK frame indicating previously correctly decoded MPDUs at the communication receiver, receiving, by the communication interface, a bit sequence from the communication transmitter, wherein the bit sequence comprises the plurality of information bits, determining, by the processor, a plurality of LLRs associated with the plurality of information bits, and combining, by the processor, the determined plurality of LLRs with a previously determined plurality of LLRs associated with the previously received MPDU.

The method according to the fourth aspect can be performed by the communication receiver according to the second aspect of the disclosure. Further features of the method according to the fourth aspect result directly from the functionality of the communication receiver according to the second aspect.

According to a fifth aspect, the disclosure relates to a computer program product comprising program code for performing the method according to the third aspect or the method according to the fourth aspect when executed on a programmable device.

The disclosure can be implemented in hardware and/or software.

BRIEF DESCRIPTION OF THE DRAWINGS

Embodiments of the disclosure will be described with respect to the following figures, in which.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be practiced. It is understood that other aspects may be utilized, and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding communication transmitter or communication receiver configured to perform the method, and vice versa. For example, if a specific method step is described, a corresponding communication transmitter or communication receiver may include a processor and/or communication interface to perform the described method step, even if such unit is not explicitly described or illustrated in the figures. Further, it is understood that the features of the various exemplary aspects described herein may be combined with each other, unless specifically noted otherwise.

Figure 1:
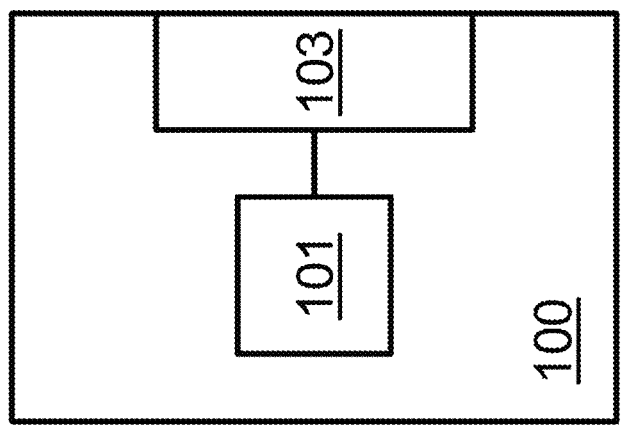
FIG. 1 shows a schematic diagram of a communication transmitter for retransmitting an MPDU to a communication receiver over a communication channel using an HARQ retransmission scheme.

FIG. 1 shows a schematic diagram of a communication transmitter 100 for retransmitting an MPDU to a communication receiver over a communication channel using an HARQ retransmission scheme. The MPDU comprises a plurality of information bits.

The communication transmitter 100 comprises a processor 101 configured to determine the MPDU to be retransmitted based on a Block ACK frame received from the communication receiver, the Block ACK frame indicating previously correctly decoded MPDUs at the communication receiver, and to generate a bit sequence to be transmitted to the communication receiver, wherein the bit sequence comprises the plurality of information bits. The communication transmitter 100 further comprises a communication interface 103 configured to transmit the bit sequence to the communication receiver for retransmitting the MPDU to the communication receiver.

Figure 2:
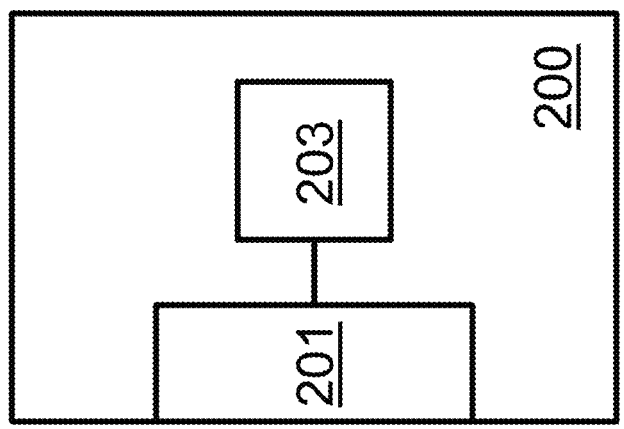
FIG. 2 shows a schematic diagram of a communication receiver for receiving a retransmitted MPDU from a communication transmitter over a communication channel using an HARQ retransmission scheme.

FIG. 2 shows a schematic diagram of a communication receiver 200 for receiving a retransmitted MPDU from a communication transmitter over a communication channel using an HARQ retransmission scheme. The retransmitted MPDU comprises a plurality of information bits. The retransmitted MPDU is associated with a previously received MPDU.

The communication receiver 200 comprises a communication interface 201 configured to transmit a Block ACK frame to the communication transmitter, the Block ACK frame indicating previously correctly decoded MPDUs at the communication receiver 200, and to receive a bit sequence from the communication transmitter, wherein the bit sequence comprises the plurality of information bits. The communication receiver 200 further comprises a processor 203 configured to determine a plurality of LLRs associated with the plurality of information bits, and to combine the determined plurality of LLRs with a previously determined plurality of LLRs associated with the previously received MPDU.

Figure 3:
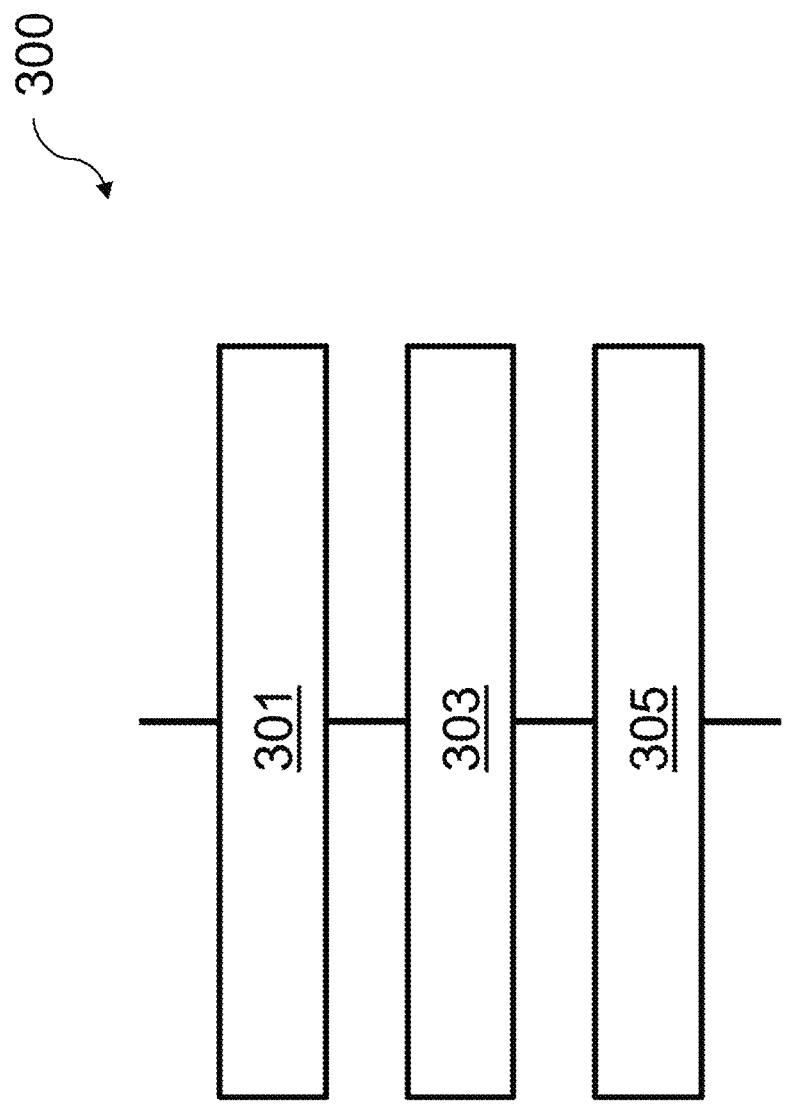
FIG. 3 shows a schematic diagram of a method of operating a communication transmitter for retransmitting an MPDU to a communication receiver over a communication channel using an HARQ retransmission scheme.

FIG. 3 shows a schematic diagram of a method 300 of operating a communication transmitter for retransmitting an MPDU to a communication receiver over a communication channel using an HARQ retransmission scheme. The MPDU comprises a plurality of information bits. The communication transmitter comprises a processor and a communication interface.

The method 300 comprises determining 301, by the processor, the MPDU to be retransmitted based on a Block ACK frame received from the communication receiver, the Block ACK frame indicating previously correctly decoded MPDUs at the communication receiver, generating 303, by the processor, a bit sequence to be transmitted to the communication receiver, wherein the bit sequence comprises the plurality of information bits, and transmitting 305, by the communication interface, the bit sequence to the communication receiver for retransmitting the MPDU to the communication receiver.

Figure 4:
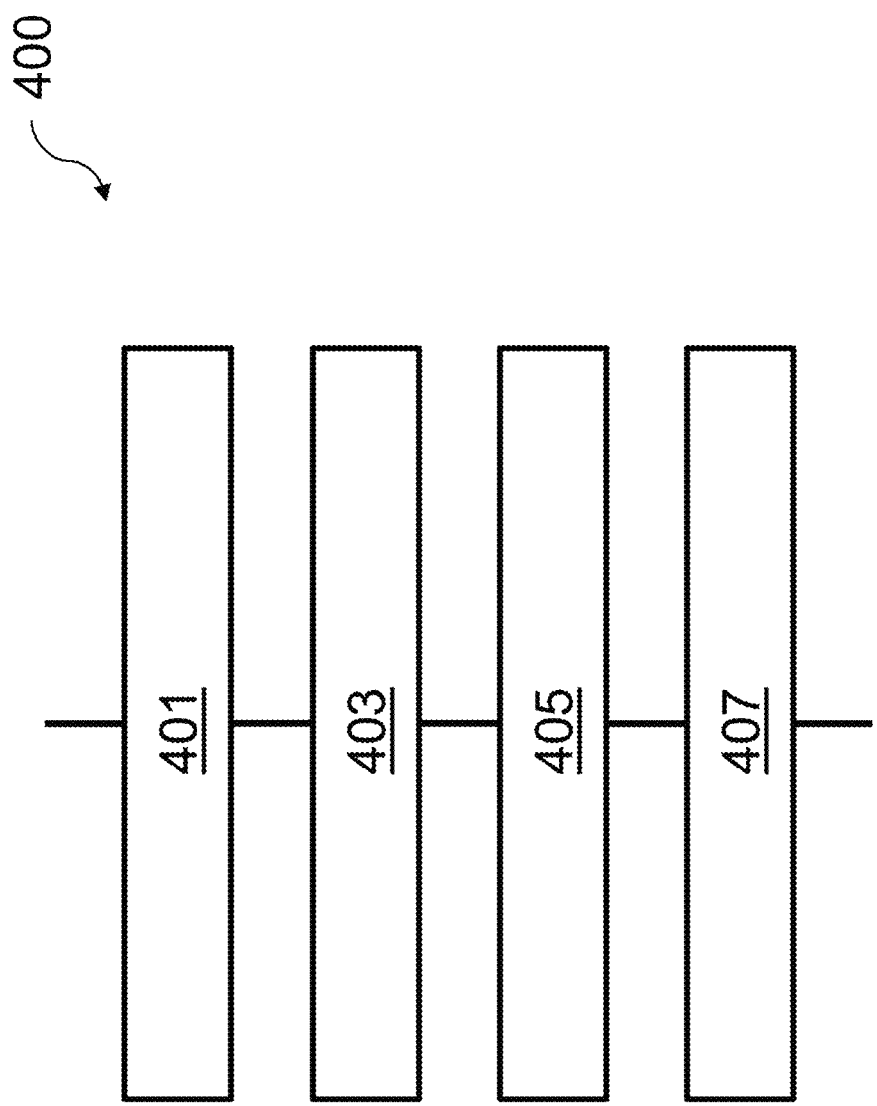
FIG. 4 shows a schematic diagram of a method of operating a communication receiver for receiving a retransmitted MPDU from a communication transmitter over a communication channel using an HARQ retransmission scheme.

FIG. 4 shows a schematic diagram of a method 400 of operating a communication receiver for receiving a retransmitted MPDU from a communication transmitter over a communication channel using an HARQ retransmission scheme. The retransmitted MPDU comprises a plurality of information bits. The retransmitted MPDU is associated with a previously received MPDU. The communication receiver comprises a communication interface and a processor.

The method 400 comprises transmitting 401, by the communication interface, a Block ACK frame to the communication transmitter, the Block ACK frame indicating previously correctly decoded MPDUs at the communication receiver, receiving 403, by the communication interface, a bit sequence from the communication transmitter, wherein the bit sequence comprises the plurality of information bits, determining 405, by the processor, a plurality of LLRs associated with the plurality of information bits, and combining 407, by the processor, the determined plurality of LLRs with a previously determined plurality of LLRs associated with the previously received MPDU.

Figure 5:
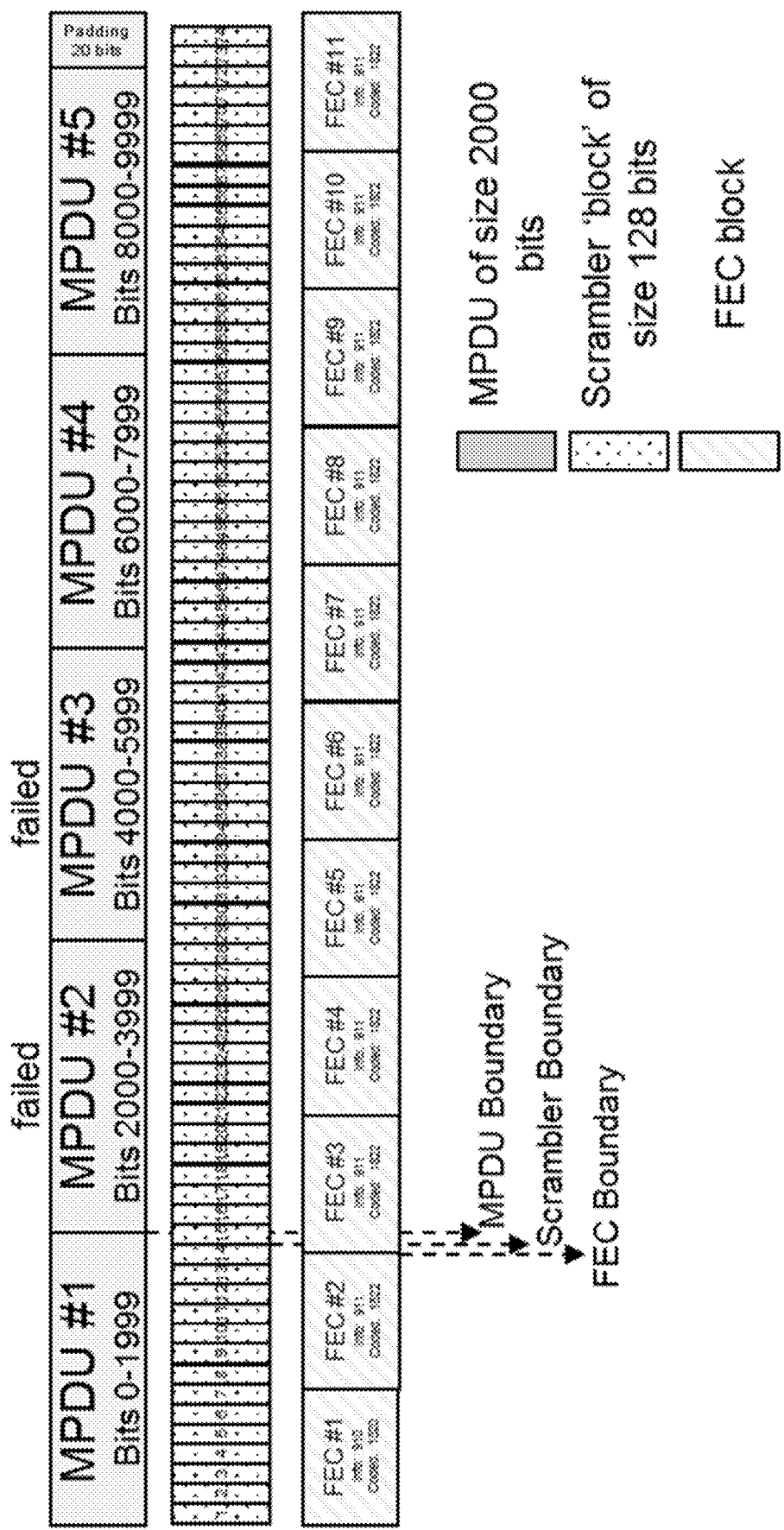
FIG. 5 shows a schematic diagram of an A-MPDU comprising five MPDUs, wherein reception of MPDU #2 and MPDU #3 by a communication receiver has failed.

FIG. 5 shows a schematic diagram of an A-MPDU comprising five MPDUs, wherein reception of MPDU #2 and MPDU #3 by a communication receiver has failed.

Figure 6:
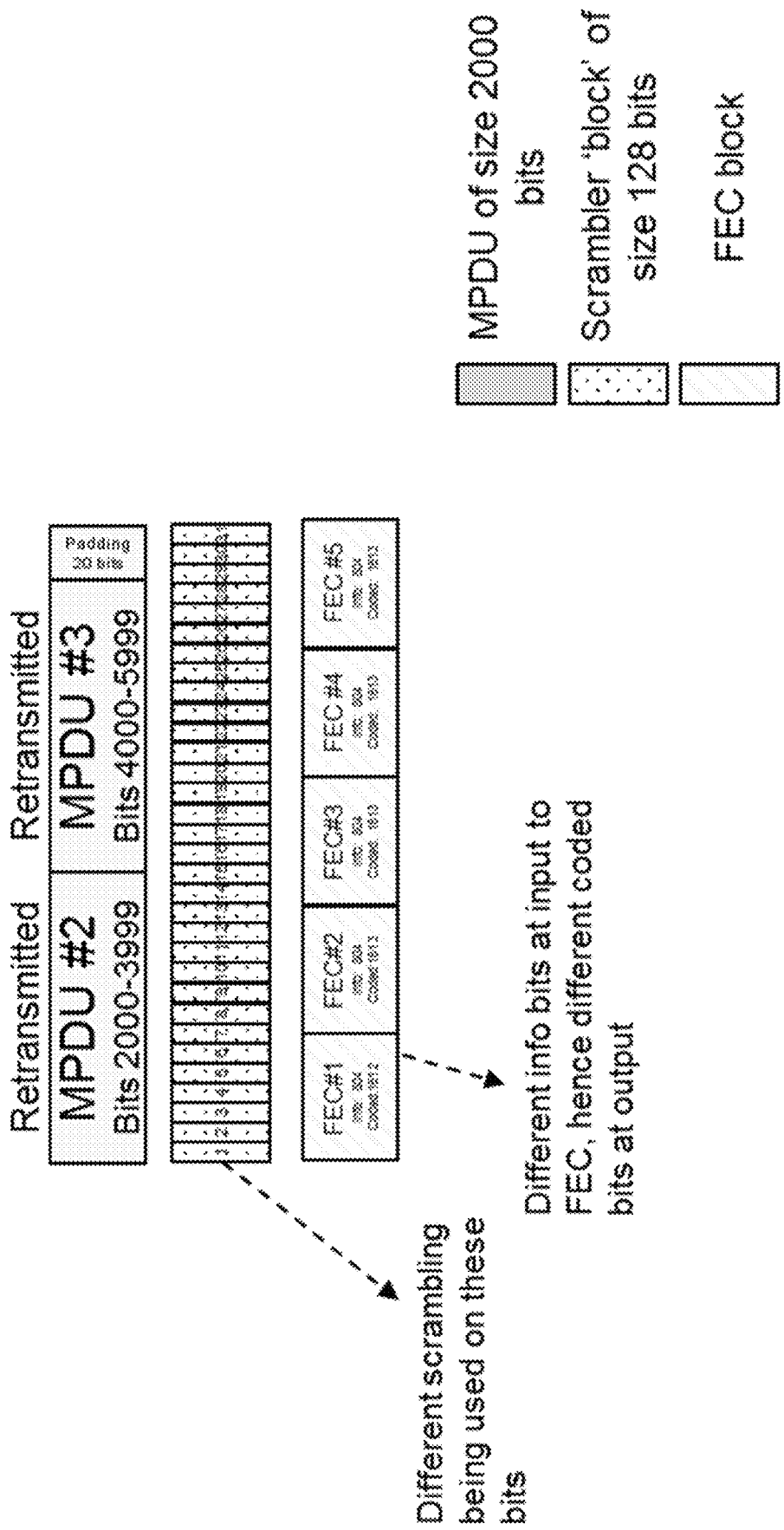
FIG. 6 shows a schematic diagram of MPDU #2 and MPDU #3 to be retransmitted by a communication transmitter to a communication receiver.

FIG. 6 shows a schematic diagram of MPDU #2 and MPDU #3 to be retransmitted by a communication transmitter to a communication receiver.

Assuming an A-MPDU was transmitted by a communication transmitter and some of the MPDUs were incorrectly decoded, the communication transmitter shall retransmit only those MPDUs that have not been correctly received by the communication receiver. As exemplarily shown in FIGS. 5 and 6, an A-MPDU comprising five MPDUs, each comprising 2000 bits, is transmitted using a coding rate of ½, wherein the 2nd and the 3rd MPDUs have failed and shall be retransmitted to the communication receiver.

A retransmission of the failed MPDUs #2 and #3 will, however, usually include different coded bits due to a different setting of the scrambler and the FEC, so that the LLRs may usually not be combined. This is a major challenge—reusing the existing retransmission mechanism, since the LLRs respective to retransmitted coded bits may usually not simply be combined with older LLRs, as there is usually no alignment between old and new codewords.

The example as shown in FIGS. 5 and 6 shows how the misalignment of the MPDUs and the scrambling and/or FEC typically is a challenge for HARQ using the IEEE 802.11 communication standard. As mentioned, embodiments of the disclosure provide a simple approach to incorporate HARQ with as few changes as possible to existing specifications and designs. The approach is based on little to minimal changes at the communication transmitter side, e.g., no extra buffers and/or memory may be required, as well as no to little changes in the retransmission (reTx) protocol using the Block ACK mechanism.

In order to simplify the usage of HARQ, especially by simplifying the communication transmitter requiring no extra buffers as well as maintaining the existing Block ACK mechanism, advantages of the approach are the following: (a) Providing a transmission scheme such that HARQ combining can be performed on the LLRs corresponding to information bits only, i.e., any transmission scheme, including existing mechanisms, can be used. Due to the systematic property of, e.g., LDPC codes being used in IEEE 802.11, this can easily be achieved. (b) Combining or evaluating different sets of LLRs corresponding to parity bits at a possibly multiple-hypothesis decoding stage is an option. (c) Only little changes to the communication transmitter may be required. Only some minimal signaling may be required, i.e., no need for buffering or other changes to the PHY layer.

Furthermore, in general, for determining the MPDU to be retransmitted, a single Block ACK frame according to the IEEE 802.11 communication standard may be used by the communication transmitter and the communication receiver, respectively, which comprises a potentially long list of MPDUs, e.g., up to 256, indicating for each of the MPDUs within an A-MPDU, which ones were decoded correctly. The MPDU to be retransmitted may therefore be determined by the communication transmitter in an implicit manner. This mechanism also covers the case that, e.g., the decoding of all MPDUs fails at the communication receiver, and that the retransmission by the communication transmitter may include those MPDUs and, e.g., additional new MPDUs.

Figure 7:
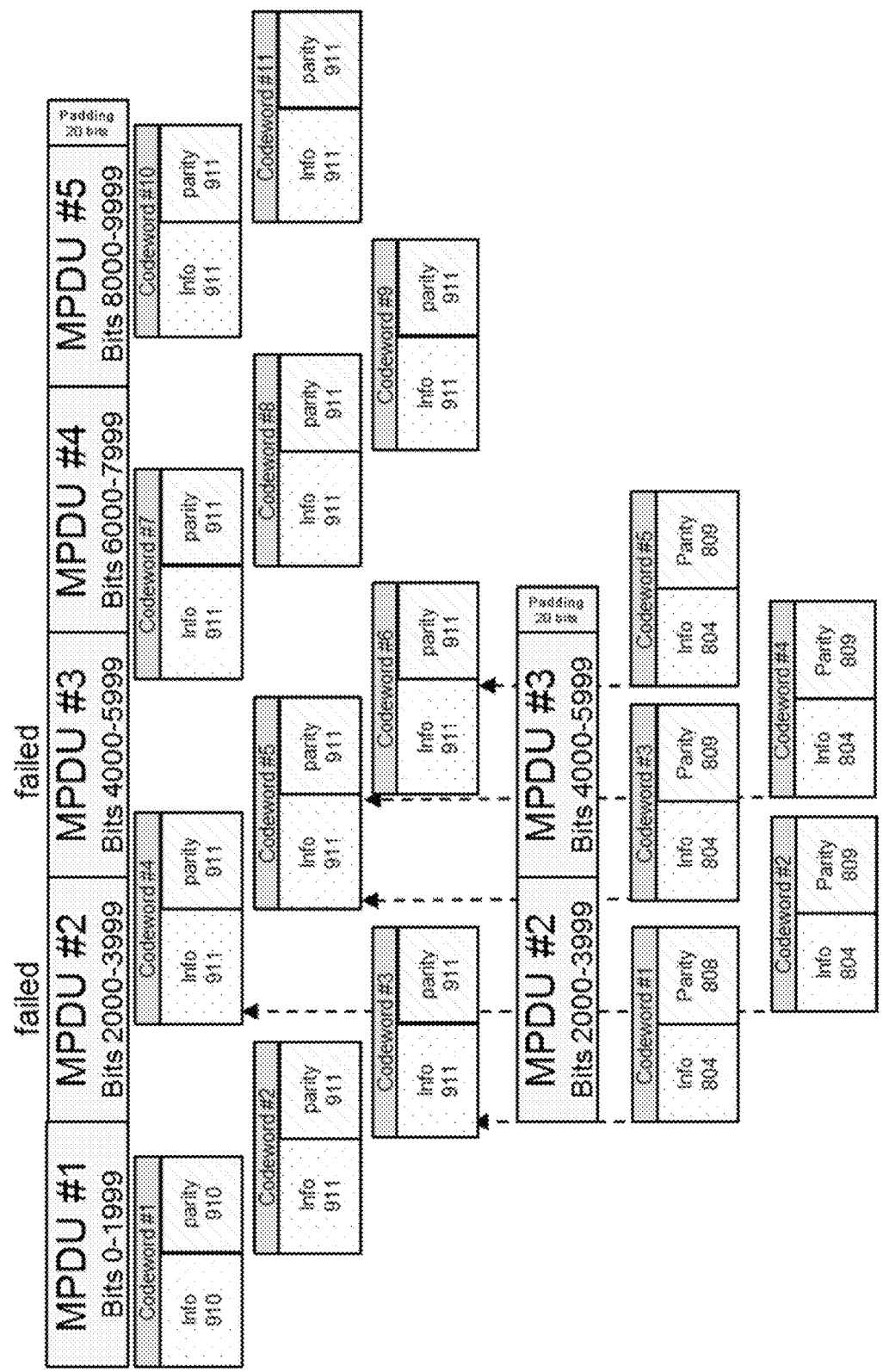
FIG. 7 shows a schematic diagram of generating a bit sequence representative of MPDU #2 and MPDU #3 to be retransmitted by a communication transmitter.

FIG. 7 shows a schematic diagram of generating a bit sequence representative of MPDU #2 and MPDU #3 to be retransmitted by a communication transmitter.

In this approach, the communication transmitter retransmits the failed MPDUs, encodes each Physical Layer Protocol Data Unit (PPDU) (containing the A-MPDU) separately, and signals to the communication receiver that this is or includes a retransmission. Furthermore, the PHY layer at the communication receiver side is informed about where the retransmitted MPDUs are within the bit sequence and in what order. This information may particularly be provided by the MAC layer at the communication receiver; rather than by over-the-air signaling. One option for the retransmitted MPDUs to be located, in order, is at the beginning of the new PPDU; this means that the receiver is implicitly indicated of the location of the retransmitted MPDUs. The communication receiver can therefore combine LLRs corresponding to the information bits with the pre-determined LLRs respective to previous transmissions. LLRs respective to parity bits from old or new transmissions can be used.

The figure depicts an example for an alignment of codewords against MPDUs in the $1^{st}$ Tx and the reTx using a coding rate of ½ in this example. In the reTx, the failed MPDUs are retransmitted and processed by the PHY layer like in any new transmission, which may be a standard operation. Information bits in the reTx may be identical to those information bits in the Pt Tx (alignment shown), wherein the parity bits may be different.

At the communication transmitter side: (a) the PHY layer block diagram may not be changed and no extra buffers and/or memories may be required; (b) the communication transmitter indicates to the communication receiver that there is a retransmission; (c) since the location of the retransmitted MPDUs needs to be known at the communication receiver, retransmitted MPDUs may, e.g., be placed at the beginning and in the same order as in the previous transmission; (d) the pre-FEC padding bits may need to be retransmitted if they were included within a previously transmitted FEC codeword.

At the communication receiver side: (a) there may be a need to combine the new LLRs associated with information bits with respective old LLRs of information bits; the LLRs of the parity bits, to be fed also into the FEC decoder, may be taken from the first transmission or later retransmissions; (b) the MAC layer may need to indicate to the PHY layer which LLRs to discard and which to maintain for future combining, e.g., based on MPDUs which were successfully decoded.

Figure 8:
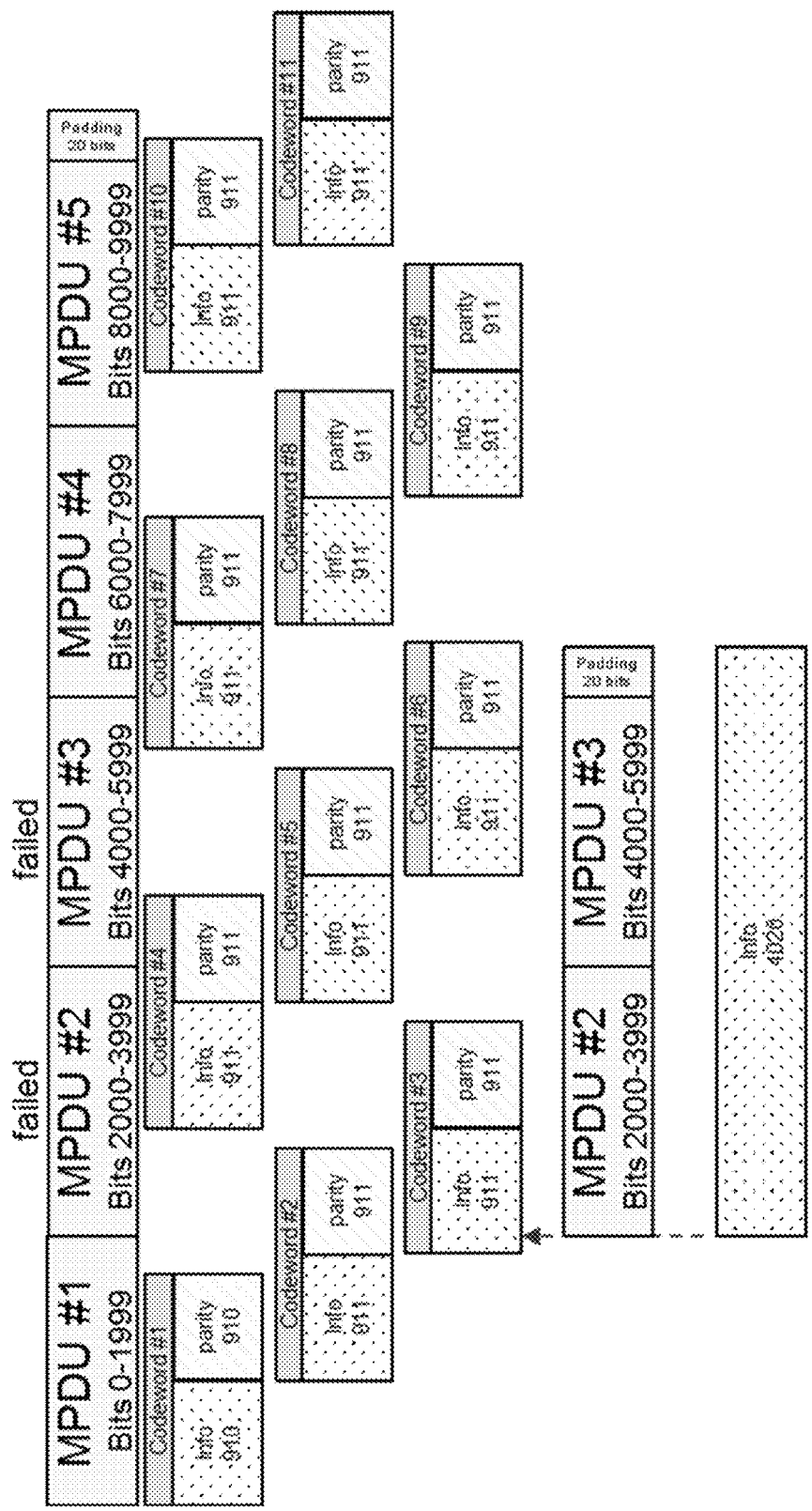
FIG. 8 shows a schematic diagram of generating a bit sequence representative of MPDU #2 and MPDU #3 to be retransmitted by a communication transmitter.

FIG. 8 shows a schematic diagram of generating a bit sequence representative of MPDU #2 and MPDU #3 to be retransmitted by a communication transmitter.

In this approach, in the retransmissions, the communication transmitter transmits only information bits, i.e., no parity bits. This enables a simpler processing at the communication receiver side, and may significantly improve the efficiency since the bit sequence in reTx may be much shorter.

Figure 9:
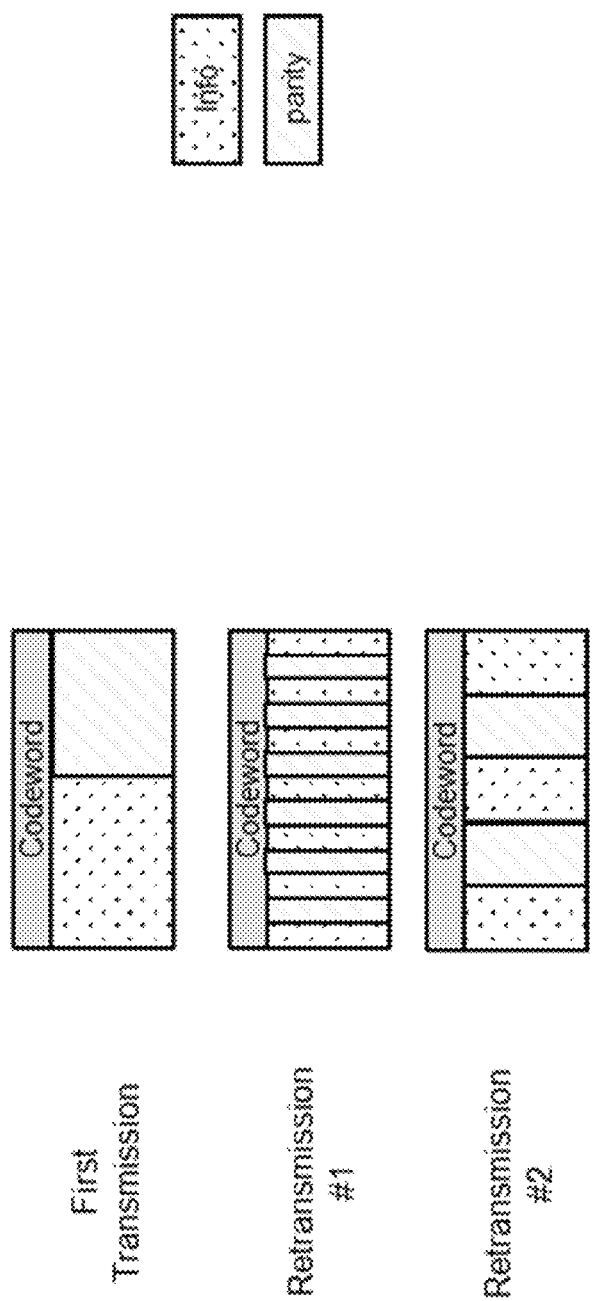
FIG. 9 shows a schematic diagram of generating a bit sequence representative of an MPDU to be retransmitted by a communication transmitter.

FIG. 9 shows a schematic diagram of generating a bit sequence representative of an MPDU to be retransmitted by a communication transmitter.

In this approach, the bits are interleaved, after encoding, differently for each retransmission, within each codeword. Coded bits—in particular information bits—corresponding to the $2^{nd}$ transmission and potentially any other retransmission, can be interleaved in a manner different than the $1^{st}$ transmission. For example, whereas at first transmission the information bits were in order at the output of the encoder, at a later retransmission they can be spread within the codeword so as to induce diversity between transmission and retransmissions. The interleaving may also be applied in cases, where no coding, i.e., no parity bits, are used.

Figure 10:
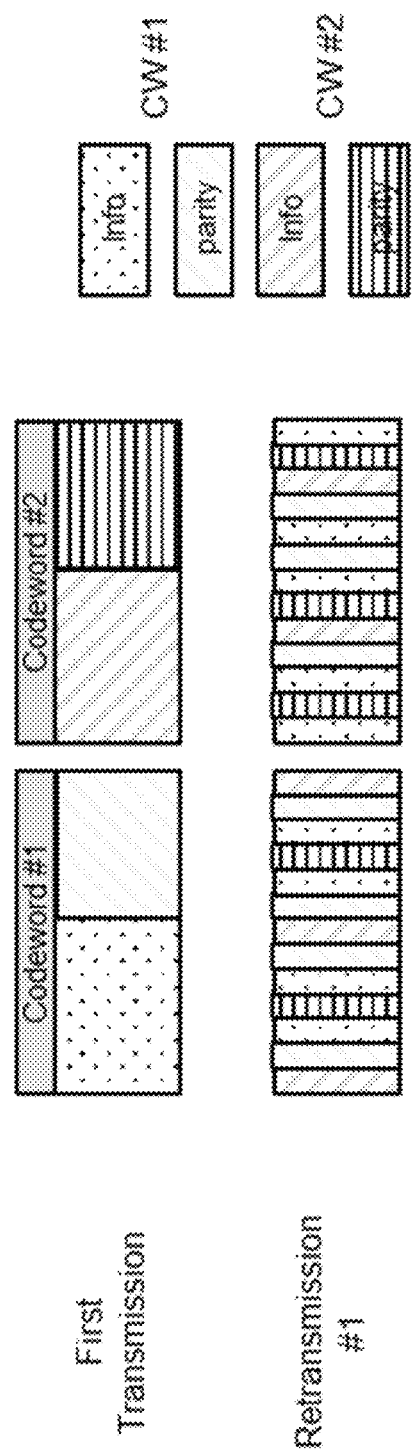
FIG. 10 shows a schematic diagram of generating a bit sequence representative of an MPDU to be retransmitted by a communication transmitter.

FIG. 10 shows a schematic diagram of generating a bit sequence representative of an MPDU to be retransmitted by a communication transmitter.

In this approach, the bits are interleaved, after encoding, differently for each retransmission, across several codewords. Similar to the previous approach, the interleaving on the encoded bits, i.e., post FEC/LDPC, can be performed between different codewords. This may increase the diversity experienced by the bits. This approach may incur additional buffering and/or delay in both transmission and reception. The interleaving may also be applied in cases, where no coding, i.e., no parity bits, are used.

In a further approach applicable to all described approaches, also the scrambling and/or descrambling challenges may be handled. The scrambling alignment can be dealt with by scrambling the coded bits, i.e., the output of the FEC encoder. However, a simpler approach without any changes to the communication transmitter block diagram is possible using a random scrambling seed in any transmission. Assuming combining only on LLRs of the information bits and using the LLRs corresponding to the parity bits of either the Pt or the $2^{nd}$ transmission, the sign of the LLRs corresponding to the information bits may be changed so that it matches the sign of the scrambling used with the seed of the chosen parity. Here, the circumstance is used that both scrambling and encoding may be linear and that an LDPC code may be systematic. There are several options for supporting this: (a) If the retransmission is uncoded, hard-decision, e.g., on the first 7 bits may yield with potentially lower success rate the seed, so that the LLRs can be descrambled and combined with previous possibly descrambled LLRs; (b) If the retransmission is coded, and optimal results are desired, indication of the seed, e.g., via the PHY preamble, may be performed to descramble the LLRs and to combine; (c) The seed can be changed between retransmissions, but according to some pre-determined approach; for example, the seed upon a retransmission can be a known function of the seed used within the previous first transmission, such as modulo function of the original first seed, multiple of that seed, etc.; (d) Another possibility if the retransmission is coded, is to decode the first codeword; if it fails, still extract, e.g., the first 7 bits and descramble.

In a further approach applicable to all described approaches, decoding is performed with different sets of parity bits, if parity bits are present within the bit sequence. The communication receiver combines the LLRs corresponding to information bits. The communication receiver tries decoding with the LLRs corresponding to parity bits for the $2^{nd}$ transmission. If unsuccessful, the communication receiver tries decoding with the LLRs corresponding to parity bits received in the $1^{st}$ transmission. This may require more memory at the communication receiver side but can yield an improved performance.

Figure 11:
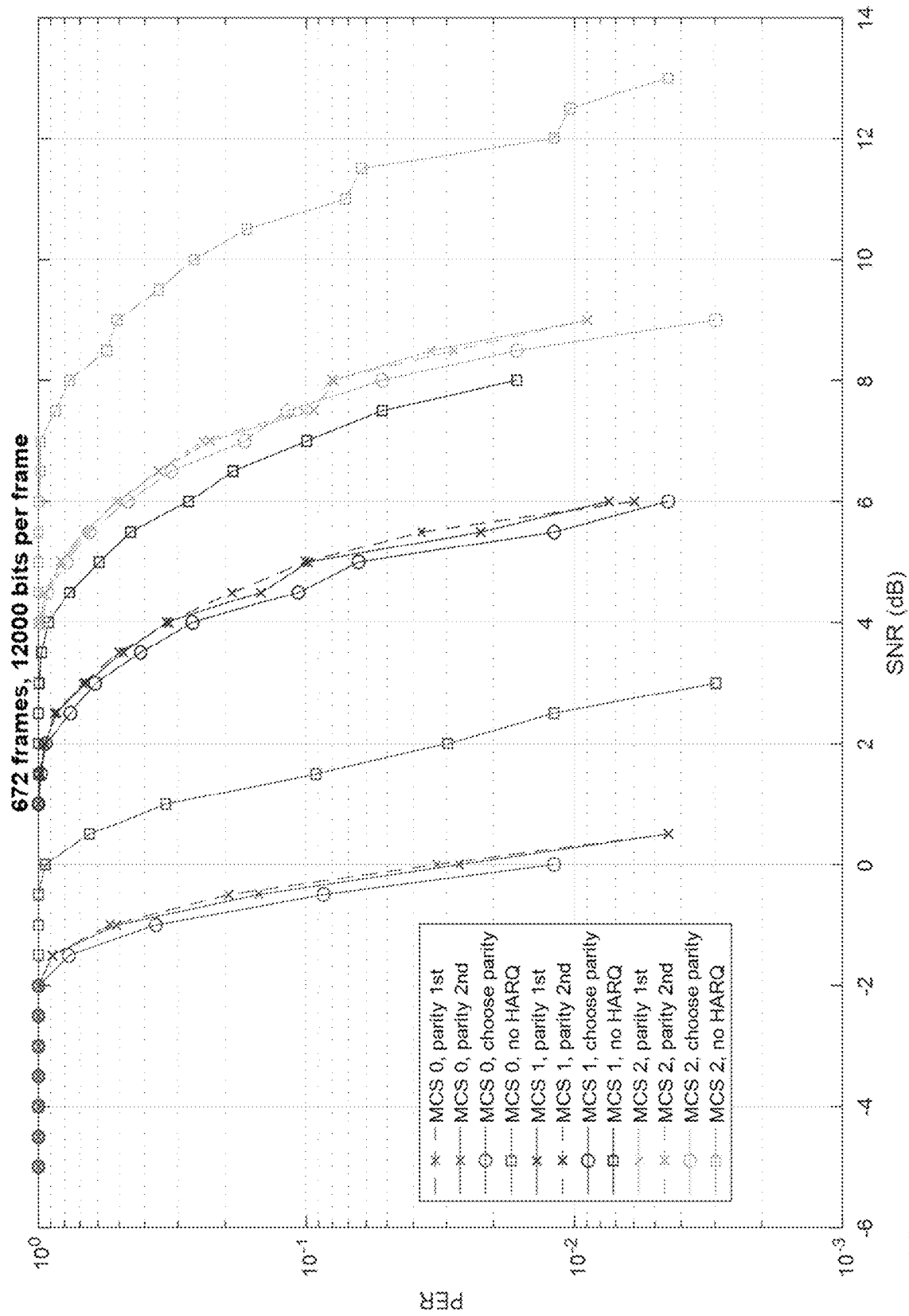
FIG. 11 shows simulation results of different approaches for generating a bit sequence.

FIG. 11 shows simulation results of different approaches for generating a bit sequence. In this regard, the performance for three different HARQ schemes is compared, assuming 2×2 Multiple Input Multiple Output (MIMO) with two streams (ML detection), 1500B, TGn-D NLOS, LDPC, MCSs 0-2.

The simulation results refer particularly to (a) combining LLRs of information bits and using parity LLRs from the $1^{st}$ transmission, i.e., parity bits in reTx may not be transmitted at all; (b) combining LLRs of information bits and using parity LLRs from the $2^{nd}$ transmission; (c) combining LLRs of information bits and choosing, i.e., evaluating both, parity LLRs from $1^{st}$ or $2^{nd}$ transmissions leading to about 0.2 dB gain.

Figure 12:
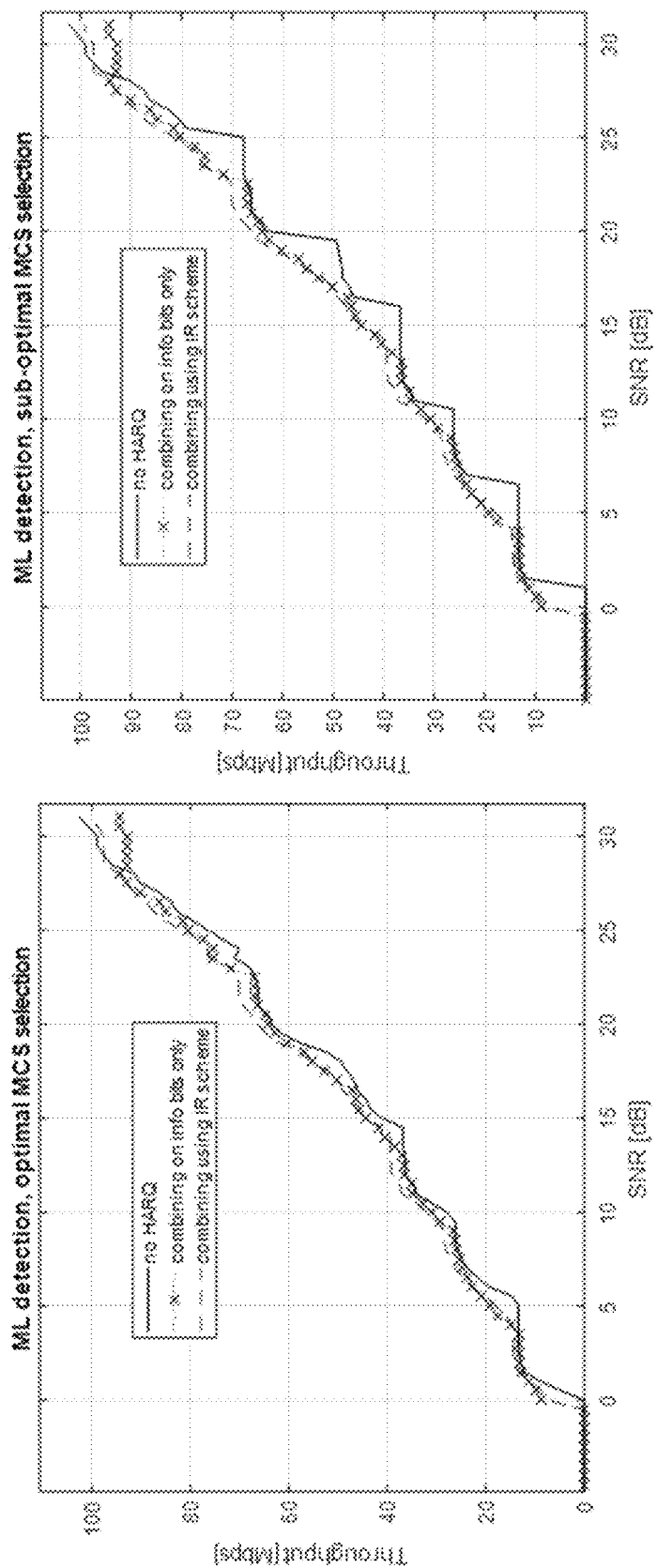
FIG. 12 shows simulation results of different approaches using HARQ.

FIG. 12 shows simulation results of different approaches using HARQ. The diagrams compare the throughput—assuming all overheads, i.e., Preamble, Short Interframe Space (SIFS), ACK etc., assuming ML detection. In particular, the following three schemes are compared: (a) No HARQ; (b) Chase combining, where in a retransmission only information bits (all of them in these simulations) are transmitted, which is a particularly practical scheme, as for example indicated in this disclosure; (c) an Incremental Redundancy (IR) HARQ scheme, where information bits and a portion of the parity bits are transmitted at every retransmission, and where LLRs respective to both information and parity bits are combined at the receiver.

For the optimal selection, the MCS is found, at each average Signal-to-Noise Ratio (SNR), which maximizes the throughput. For the suboptimal selection, the MCS is found, at each average SNR, which maximizes the throughput with an additional constraint that without HARQ Partial Equivalence Relations (PER)<10% and with HARQ PER before combining <20%. Both HARQ schemes may perform similarly well.

Figure 13:
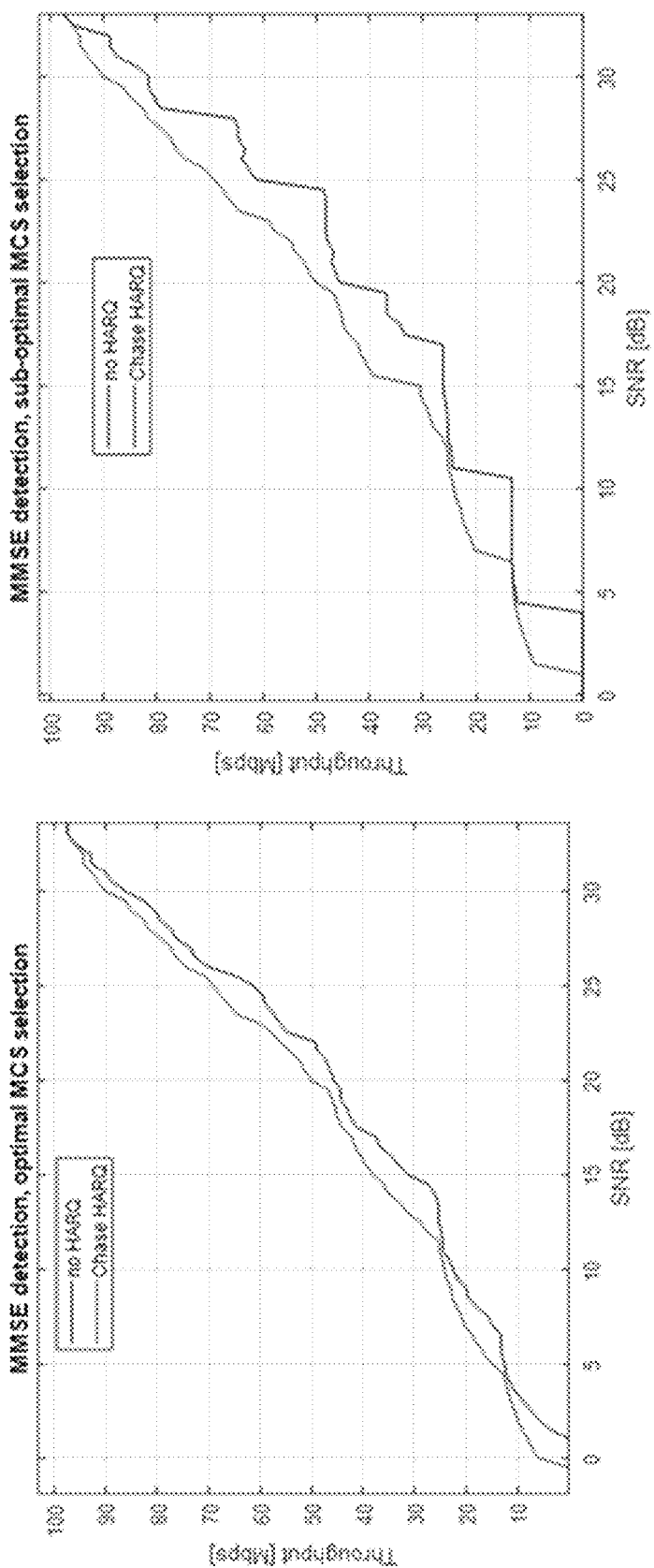
FIG. 13 shows simulation results of different approaches using HARQ.

FIG. 13 shows simulation results of different approaches using HARQ. The diagrams compare the throughput—assuming all overheads, i.e., Preamble, SIFS, ACK etc., assuming Minimum Mean Square Error (MMSE) detection. In particular, the following two schemes are compared: (a) No HARQ; (b) Chase combining, where in a retransmission only information bits (all of them in these simulations) are transmitted, which is a particularly practical scheme. It is observed that the Chase HARQ with information bits transmitted only at a retransmission may outperform the no HARQ scheme. Assuming a suboptimal rate adaptation scheme, the gap becomes even more significant.

In summary, the communication transmitter and the communication receiver allow for an efficient use of HARQ based on a transparent alignment focusing on information bits. The communication transmitter and the communication receiver are particularly capable to communicate within the framework of the IEEE 802.11 communication standard.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein. Although the elements in the following claims are recited in a particular sequence with corresponding labeling, unless the claim recitations otherwise imply a particular sequence for implementing some or all of those elements, those elements are not necessarily intended to be limited to be implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

REFERENCE SIGNS

100 Communication transmitter
101 Processor
103 Communication interface
200 Communication receiver
201 Communication interface
203 Processor
300 Method of operating a communication transmitter
301 Determining
303 Generating
305 Transmitting
400 Method of operating a communication receiver
401 Transmitting
403 Receiving
405 Determining
407 Combining

What is claimed is:

1. A communication transmitter for retransmitting a medium access control (MAC) protocol data unit (MPDU) to a communication receiver over a communication channel using a hybrid automatic repeat request (HARQ) retransmission scheme, the MPDU comprising a plurality of information bits, the communication transmitter comprising:
a processor configured to:
determine the MPDU to be retransmitted based on a block acknowledgement (Block ACK) frame received from the communication receiver, the Block ACK frame indicating previously correctly decoded MPDUs at the communication receiver, and to generate a bit sequence to be transmitted to the communication receiver, wherein the bit sequence comprises the plurality of information bits, the plurality of information bits being associated with a plurality of log likelihood ratio (LLRs), the plurality of LLRs being configured to be combined at the communication receiver with a plurality of LLRs associated with a previously received MPDU, wherein the bit sequence further comprises a plurality of parity bits;
determine a further plurality of LLRs associated with the plurality of parity bits, and to include a subgroup of the determined further plurality of LLRs associated with the plurality of parity bits in the bit sequence; and
a communication interface configured to transmit the bit sequence to the communication receiver for retransmitting the MPDU to the communication receiver.

2. The communication transmitter of claim 1, wherein the processor is configured to select a first group of information bits and a second group of information bits from the plurality of information bits of the MPDU, to encode the first group of information bits using a forward error correction (FEC) encoder to obtain a first group of parity bits, to encode the second group of information bits using the FEC encoder to obtain a second group of parity bits, and to include the first group of parity bits and the second group of parity bits into the bit sequence.

3. The communication transmitter of claim 2, wherein the processor is configured to append the first group of parity bits to the first group of information bits, and to append the second group of parity bits to the second group of information bits.

4. The communication transmitter of claim 3, wherein the processor is configured to append the second group of information bits and the second group of parity bits to the first group of information bits and the first group of parity bits.

5. A communication transmitter for retransmitting a medium access control (MAC) protocol data unit (MPDU) to a communication receiver over a communication channel using a hybrid automatic repeat request (HARQ) retransmission scheme, the MPDU comprising a plurality of information bits, the communication transmitter comprising:
a processor configured to:
determine the MPDU to be retransmitted based on a block acknowledgement (Block ACK) frame received from the communication receiver, the Block ACK frame indicating previously correctly decoded MPDUs at the communication receiver, and to generate a bit sequence to be transmitted to the communication receiver, wherein the bit sequence comprises the plurality of information bits;
select a first group of information bits and a second group of information bits from the plurality of information bits of the MPDU, to encode the first group of information bits using a forward error correction (FEC) encoder to obtain a first group of parity bits, to encode the second group of information bits using the FEC encoder to obtain a second group of parity bits, and to include the first group of parity bits and the second group of parity bits into the bit sequence;
select a first plurality of subgroups of information bits from the first group of information bits and a first plurality of subgroups of parity bits from the first group of parity bits, and to select a second plurality of subgroups of information bits from the second group of information bits and a second plurality of subgroups of parity bits from the second group of parity bits; and
a communication interface configured to transmit the bit sequence to the communication receiver for retransmitting the MPDU to the communication receiver.

6. The communication transmitter of claim 5, wherein the processor is configured to interleave the first plurality of subgroups of information bits and the first plurality of subgroups of parity bits within the bit sequence, and to interleave the second plurality of subgroups of information bits and the second plurality of subgroups of parity bits within the bit sequence.

7. The communication transmitter of claim 5, wherein the processor is configured to interleave the first plurality of subgroups of information bits, the first plurality of subgroups of parity bits, the second plurality of subgroups of information bits, and the second plurality of subgroups of parity bits within the bit sequence.

8. The communication transmitter of claim 6, wherein the processor is configured to perform interleaving based upon an interleaving scheme, and wherein the communication interface is configured to communicate the interleaving scheme to the communication receiver.

9. The communication transmitter of claim 1, wherein the processor is configured to perform at least one of: scrambling the plurality of information bits of the MPDU, or scrambling the bit sequence.

10. The communication transmitter of claim 9, wherein the processor is configured to perform scrambling based upon a scrambling seed, and wherein the communication interface is configured to communicate the scrambling seed to the communication receiver.

11. The communication transmitter of claim 2, wherein the processor is configured to puncture the plurality of information bits or the first and second groups of parity bits to be included within the bit sequence.

12. A communication receiver for receiving a retransmitted medium access control (MAC) protocol data unit (MPDU) from a communication transmitter over a communication channel using a hybrid automatic repeat request (HARQ) retransmission scheme, the retransmitted MPDU comprising a plurality of information bits, the retransmitted MPDU being associated with a previously received MPDU, the communication receiver comprising:
a communication interface configured to transmit a block acknowledgement (Block ACK) frame to the communication transmitter, the Block ACK frame indicating previously correctly decoded MPDUs at the communication receiver, and to receive a bit sequence from the communication transmitter, wherein the bit sequence comprises the plurality of information bits; and
a processor configured to:
determine a plurality of log-likelihood ratios (LLRs) associated with the plurality of information bits, and to combine the determined plurality of LLRs with a previously determined plurality of LLRs associated with the previously received MPDU, wherein the bit sequence further comprises a plurality of parity bits; and
determine a further plurality of LLRs associated with the plurality of parity bits, and to include a subgroup of the determined further plurality of LLRs associated with the plurality of parity bits in the bit sequence.

13. The communication receiver of claim 12, wherein the communication interface is configured to receive an interleaving scheme or a scrambling seed from the communication transmitter, and to determine an alignment of the plurality of information bits or an alignment of the plurality of parity bits within the bit sequence based upon the interleaving scheme or the scrambling seed.

14. A method of operating a communication receiver for receiving a retransmitted medium access control (MAC) protocol data unit (MPDU) from a communication transmitter over a communication channel using a hybrid automatic repeat request (HARQ) retransmission scheme, the retransmitted MPDU comprising a plurality of information bits, the retransmitted MPDU being associated with a previously received MPDU, the communication receiver comprising a communication interface and a processor, the method comprising:
transmitting, by the communication interface, a block acknowledgement (Block ACK) frame to the communication transmitter, the Block ACK frame indicating previously correctly decoded MPDUs at the communication receiver;
receiving, by the communication interface, a bit sequence from the communication transmitter, wherein the bit sequence comprises the plurality of information bits;
determining, by the processor, a plurality of log-likelihood ratios (LLRs) associated with the plurality of information bits, wherein the bit sequence further comprises a plurality of parity bits;
combining, by the processor, the determined plurality of LLRs with a previously determined plurality of LLRs associated with the previously received MPDU;
determining, by the processor, a further plurality of LLRs associated with the plurality of parity bits; and
using, by the processor, a subgroup of the determined further plurality of LLRs associated with the plurality of parity bits to include in the bit sequence.

15. The method of claim 14, wherein the method comprising:
receiving an interleaving scheme or a scrambling seed from the communication transmitter; and
determining an alignment of the plurality of information bits or an alignment of the plurality of parity bits within the bit sequence based upon the interleaving scheme or the scrambling seed.

\* \* \* \* \*